United States Patent
Lee et al.

(10) Patent No.: US 8,565,327 B2
(45) Date of Patent: Oct. 22, 2013

(54) INTERSYMBOL INTERFERENCE REMOVAL METHOD

(75) Inventors: Yao-Nan Lee, Sinshih Township, Tainan County (TW); Ching-Sheng Ni, Sinshih Township, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 392 days.

(21) Appl. No.: 13/076,049

(22) Filed: Mar. 30, 2011

(65) Prior Publication Data

US 2012/0250801 A1    Oct. 4, 2012

(51) Int. Cl.
*H04K 1/10*    (2006.01)

(52) U.S. Cl.
USPC .......................................... 375/260

(58) Field of Classification Search
USPC .......................................... 375/260
See application file for complete search history.

(56) References Cited

U.S. PATENT DOCUMENTS

| | | | | |
|---|---|---|---|---|
| 7,042,937 B2* | 5/2006 | Birru | | 375/233 |
| 2004/0264587 A1* | 12/2004 | Morejon et al. | | 375/260 |
| 2009/0279626 A1* | 11/2009 | Wang | | 375/260 |
| 2011/0310952 A1* | 12/2011 | Wei et al. | | 375/233 |
| 2012/0236926 A1* | 9/2012 | Bourdoux et al. | | 375/233 |

* cited by examiner

*Primary Examiner* — Juan A Torres
(74) *Attorney, Agent, or Firm* — McClure, Qualey & Rodack, LLP

(57) ABSTRACT

An Inter-Symbol Interference (ISI) removing method for a received signal executed by a receiver in an Orthogonal frequency division multiplexing (OFDM) system to estimate a frequency-domain data signal carried on the received signal is provided. The method comprises the steps of: removing the first interference of known signal of the received signal; estimating a first data signal according to the received signal; performing a hard decision operation on the first data signal to generate a first frequency-domain signal; performing an Inverse Fast Fourier Transform operation on the first frequency-domain signal to generate a first time-domain signal; creating a tailing signal according to the first time-domain signal; removing a preamble signal from the received signal to generate a second signal; combining the first time-domain signal and the second signal to estimate the frequency-domain data signal.

10 Claims, 7 Drawing Sheets

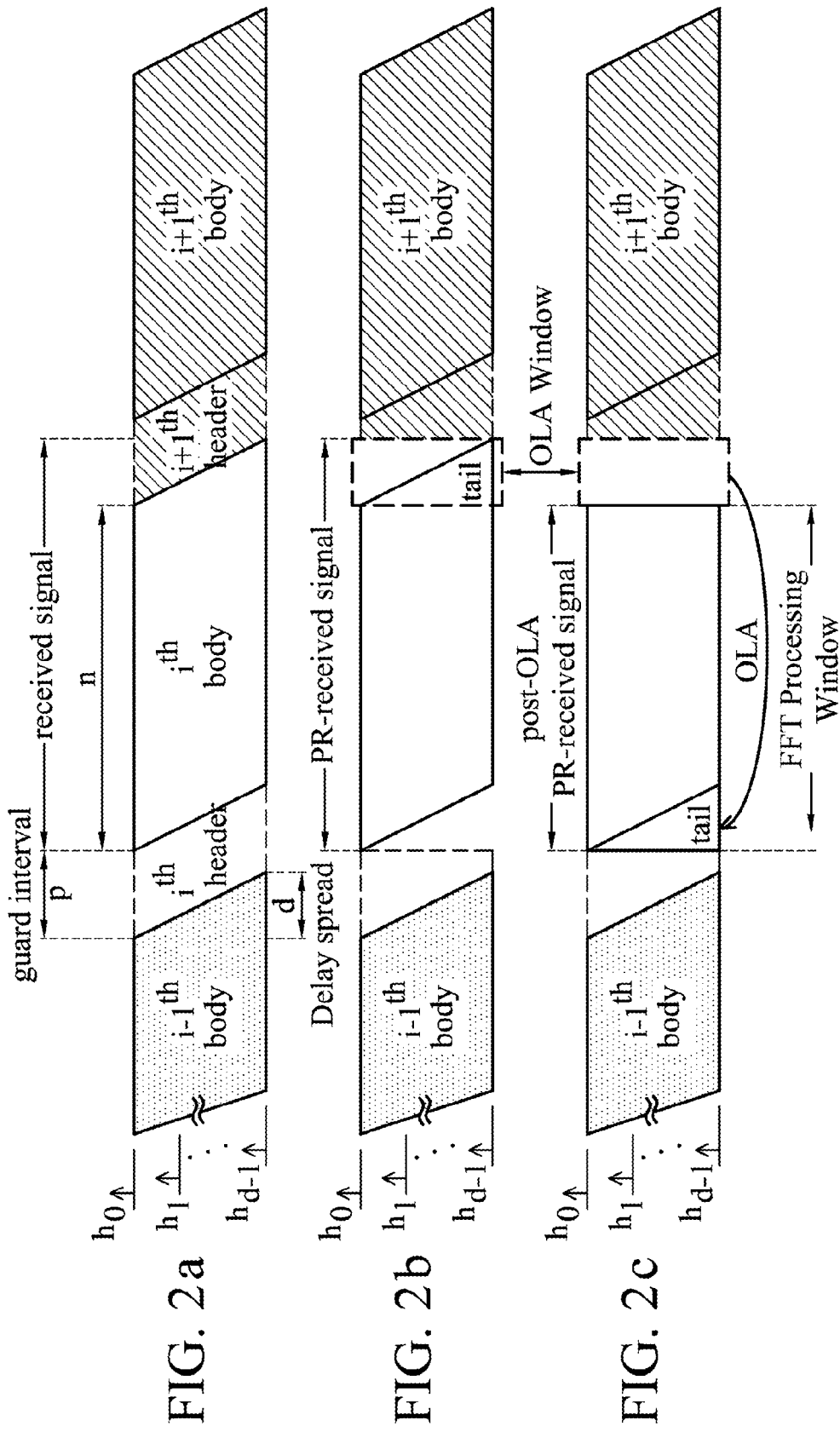

INTERSYMBOL INTERFERENCE REMOVAL METHOD

BACKGROUND OF THE INVENTION

1. Field of the Invention

The present invention relates to an interference removal method, and more particularly to inter-symbol interference (ISI) removal method in an orthogonal frequency division multiplexing (OFDM) system.

2. Description of the Related Art

Orthogonal frequency division multiplexing (OFDM) is a very effective technique to mitigate inter-symbol interference (ISI) in handling time dispersion of multipath fading channels. Conventionally, OFDM symbols are separated by cyclic prefix (CP) in order that receivers can demodulate data very simply. Recently, Time domain synchronous orthogonal frequency division multiplexing (TDS-OFDM) has been attracting more and more interests, in which pseudo-noise (PN) sequences take the place of CP for serving as guard intervals and also as training symbols. Chinese standard of digital terrestrial television broadcasting (DTTB), has adopted TDS-OFDM as one of its modulation schemes.

In TDS-OFDM systems, the inserted PN sequences acts as training symbols for the purposes of the receiver's synchronization and channel estimation, which makes it unnecessary to add pilots, as DVB-T system, in the transmitted signal spectrum. For this reason, basically TDS-OFDM can obtain higher channel throughout than CP-OFDM. Nevertheless, many algorithms in CP-OFDM including synchronization and channel estimation are so different that they cannot be applied to TDS-OFDM directly. In this paper, we will concentrate on the channel estimation and equalization in TDS-OFDM systems.

BRIEF SUMMARY OF THE INVENTION

An embodiment of an ISI removing method for a received signal executed by a receiver in an OFDM system to estimate a frequency-domain data signal carried on the received signal is provided. The method comprises the step of removing the first interference of known signal of the received signal; estimating a first data signal according to the received signal; performing a hard decision operation on the first data signal to generate a first frequency-domain signal; performing an Inverse Fast Fourier Transform operation on the first frequency-domain signal to generate a first time-domain signal; creating a tailing signal according to the first time-domain signal; removing a preamble signal from the received signal to generate a second signal; combining the first time-domain signal and the second signal to estimate the frequency-domain data signal.

Another embodiment of the invention provides a receiver in an OFDM system over large delay-spread channels. The receiver comprises a preamble removal unit, an ISI removal unit, a one-tap equalization unit and a tailing signal generation unit. The preamble removal unit receives and removes preamble signals from a received signal to generate a preamble removed signal according to a time domain channel impulse response. The ISI removal unit receives and removes an inter symbol interference from the preamble removed signal to generate a first signal. The one-tap equalization unit receives the first signal to generate a first frequency domain data signal. The tailing signal generation unit receives the first frequency domain data signal to generate a tailing signal, wherein the first signal is generated according to the tailing signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2a shows a schematic diagram of consecutive TDS-OFDM signal frames in a multipath environment, wherein the length of delay spread is shorter than that of the preamble signal.

FIG. 2b and FIG. 2c show the operation of the conventional OLA equalization operation in a multipath channel with the length of delay spread smaller than that of the preamble signal.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following paragraphs, two inter-symbol interference (ISI) removing methods for TDS-OFDM/zero padding orthogonal frequency division multiplexing (ZP-OFDM) systems over delay-spread channels are described. The first ISI removing method focuses on the situation that the length of delay-spread channels is smaller or equal to the length of the preamble signal. The second ISI removing method focuses on the situation that the length of delay-spread channels is larger than the length of the preamble signal. The first ISI removing method may also be applied on the situation that the length of delay-spread channels is larger than the length of the preamble signal, but the performance is not good enough.

Figure 1:
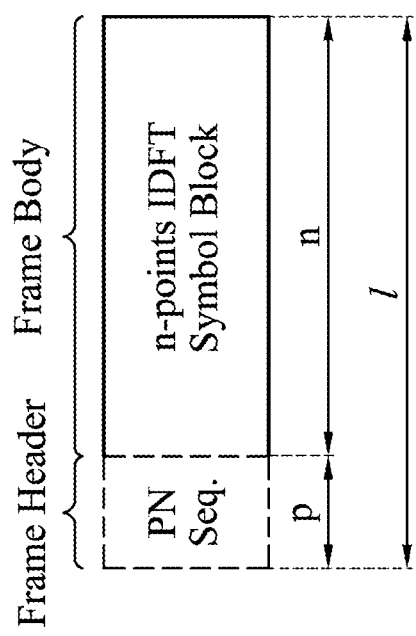
FIG. 1 shows a frame structure of a TDS-OFDM signal.

FIG. 1 shows a frame structure $\{X_{i,j}, j \in [0, p+n-1]\}$ of a TDS-OFDM signal, where $X_{i,j}$ denotes the $j^{th}$ symbol of the $i^{th}$ frame. The frame consists of one frame header and one frame body. The frame header $\{x_{i,j}=a_{i,j}, j \in [0, p-1]\}$ is a length-p BPSK-modulated time-domain pseudo-random (PN) sequence. The frame body $\{x_{i,j}=s_{i,j-p}, j \in [p, p+n-1]\} = IDFT_n\{S_{i,k}, k \in [0, n-1]\}$ is a length-n inverse discrete Fourier transform (IDFT) symbol block with frequency domain data symbols $S_{i,k}$, where k is the subcarrier index. We assume that the underlying discrete-time radio channel is time-invariant and can be modeled as a finite impulse response filter $h[v]=\sum_{m=0}^{d-1} h_m \cdot \delta[v-m]$ with d being the delay spread. Then, the symbol-spaced received signal can be mathematically expressed as $$r_m = \sum_{i=-\infty}^{\infty} \sum_{j=0}^{l-1} x_{i,j} \cdot h[m-(i \cdot l + j)] + w_m, \qquad (1)$$

where l=p+n is the total length of a TDS-OFDM signal frame and $w_m$ denotes the zero-mean additive white Gaussian noise (AWGN) with variance $\delta^2$. At the receiver, the channel impulse response (CIR) is assumed to be perfectly known and the signal-to-noise ratio (SNR) is defined as $$\frac{E\{\|s_{i,j-p}\|^2\}}{\delta^2}.$$

A well-known property in CP-OFDM is that a linear convolution between the transmitted signal and the CIR would transform into a circular convolution. This converts time-domain convolution channels into parallel channels in the frequency domain. With this property, simple one-tap frequency-domain equalization can be carried out via DFT for demodulating data symbols. However, such circular convolution property no longer preserves in the TDS-OFDM system due to the adoption of the time-domain preamble signal as the guard interval. In order to restore such property in the TDS-OFDM system, specific operations—preamble removal (PR) and overlap-and-add (OLA)—must be done first. After the property is re-established, the same data demodulation procedure done in the CP-OFDM system can be performed in the TDS-OFDM system as well.

When the $i^{th}$ TDS-OFDM signal frame traverses a multi-path channel with delay spread d, the receiver needs to collect (n+d−1) samples, $r_i=[r_{(i-1) \cdot l+p}, \ldots, r_{(i-1) \cdot l+p+(n+d-2)}]^T$, for demodulation as shown in FIG. 2(a). The received signal vector can be represented as $$r_i = [H_{p,i}, 0]^T \cdot p_i + H \cdot s_i + [0, H_{p,i+1}]^T \cdot p_{i+1} + w_i, \qquad (2)$$

where H is the (n+d−1)×n Toeplitz matrix with first column $[h_0 \ldots, h_{d-1}, 0 \ldots, 0]^T$, $[H_{p,i}, 0]^T$ is the (n+d−1)×(d−1) Toeplitz matrix with first column $[h_{d-1}, \ldots h_1]^T$, $[0, H_{p,i+1}]^T$ is the (n+d−1)×(d−1) Toeplitz matrix in which $H_{p,i+1}$ is the (d−1)×(d−1) upper triangular Toeplitz matrix with first column $[h_0 \ldots h_{d-2}]$, $s_i=[s_{i,0}, \ldots, s_{i,n-1}]^T$ is the desired time-domain frame body, $p_i=[s_{i-1,n-(d-p)}, \ldots, s_{i-1,n-1}, a_{i,0}, \ldots a_{i,p-1}]^T$ and $p_{i+1}=[a_{i+1,0}, \ldots a_{i+1,p-1}, s_{i+1,0}, \ldots s_{i+1,d-p-2}]^T$ respectively represent preamble signal of the $i^{th}$ and the $(i+1)^{th}$ signal frames that need to be removed, and $w_i=[w_{(i-1) \cdot l+p}, \ldots w_{(i-1) \cdot l+p+(n+d-2)}]^T$ denotes the AWGN vector.

After removal of the preamble signal and its effect due to channel's delay spread as shown in FIG. 2(b), the preamble-removed received (PR-received) signal vector can be expressed as $$r'_i = [r_{i,0}, \ldots, r_{i,n+d-2}] = H \cdot s_i + W_i. \qquad (3)$$

The desired circular convolution property can then be established by performing the OLA operation, which adds the last (d−1) PR-received signal components (within the OLA window) to the first (d−1) PR-received signal components (within the FFT processing window) as shown in FIG. 2(c).

The post-OLA PR-received signal vector $r''_i$ can be mathematically expressed as $$r''_i = [r'_{i,0}, \ldots, r'_{i,n-1}]^T + [r'_{i,n}, \ldots, r'_{i,n+d-2}, 0, \ldots 0]^T = H_{cir} \cdot s_i + W''_i, \qquad (4)$$

wherein $H_{cir}$ is the n×n circulant matrix with $[h_0, 0, \ldots 0, h_{d-1}, \ldots, h_1]$ as the first row and $W''_i$ is the OLA noise vector.

The equalized data symbol $\tilde{s}_{i,k}$ can then be evaluated via DFT as $$\tilde{s}_{i,k} = \frac{DFT_n\{r''_i\}}{H_{i,k}} = \frac{S_{i,k} \cdot H_{i,k} + W''_{i,k}}{H_{i,k}} = S_{i,k} + \frac{W''_{i,k}}{H_{i,k}}, \qquad (5)$$

where $H_{i,k}$ and $W''_{i,k}$ are the frequency response of the channel and the OLA noise evaluated at subcarrier k of the $i^{th}$ signal frame, respectively. The data demodulation is completed by setting the detected data symbol $\hat{S}_{i,k}$ to the constellation point closest to the equalized data symbol $\tilde{S}_{i,k}$.

In a small delay-spread channel with d≤p, the perturbation source affecting the detection accuracy of the data symbol $\tilde{s}_{i,k}$ is solely from the additive noise as evaluated in (5). In this case, the bit error rate (BER) continuously decreases with the increasing SNR. However, this is not the case in a large delay-spread channel with d>p, such as the one shown in FIG. 3(a).

Figure 3A:
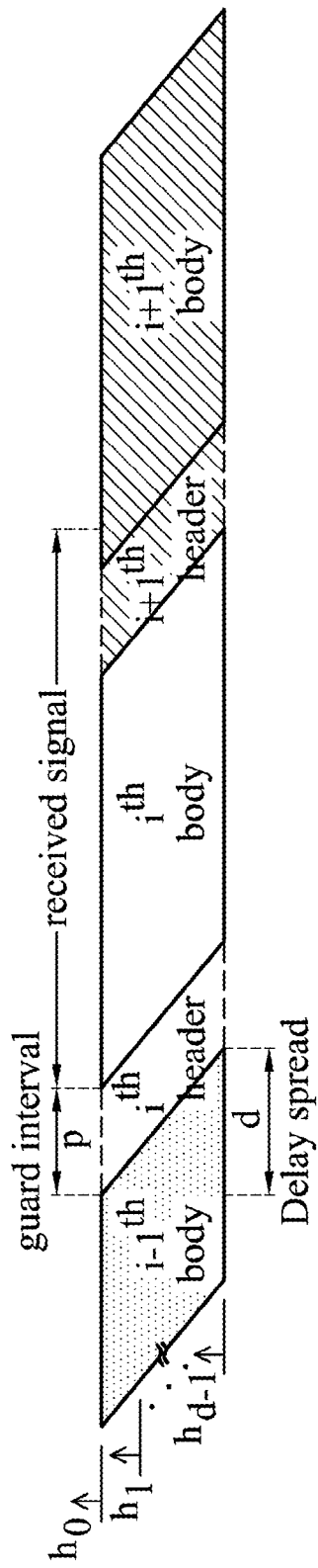
FIG. 3a shows a schematic diagram of consecutive TDS-OFDM signal frames received by a in a multipath environment, wherein the length of the time-domain channel impulse response is larger than the length of the preamble signal.

Please refer to FIGS. 3a to 3d. FIGS. 3a to 3d show the flow of the proposed iterative equalization algorithm in a large delay-spread channel. The large delay-spread channel means that the length of delay-spread is larger than the length of guard interval, such as shown in FIG. 3a.

The received signal vector $r_i$ in the large delay-spread channel can be expressed:

$$r_i = [H_{p,i}, 0]^T \cdot p_i w_i$$

where H is the (n+d−1)×n Toeplitz matrix with first column $[h_0 \ldots, h_{d-1}, 0 \ldots, 0]^T$, $[H_{p,i}, 0]^T$ is the (n+d−1)×(d−1) Toeplitz matrix with first column $[h_{d-1}, \ldots h_1]^T$, $[0 H_{p,i+1}]^T$ is the (n+d−1)×(d−1) Toeplitz matrix in which $H_{p,i+1}$ is the (d−1)×(d−1) upper triangular Toeplitz matrix with first column $[h_0 \ldots h_{d-2}]$, $s_i=[s_{i,0}, \ldots, s_{i,n-1}]^T$ is the desired time-domain frame body, $p_i=[s_{i-1,n-(d-p)}, \ldots, s_{i-1,n-1}, a_{i,0}, \ldots a_{i,p-1}]^T$ and $p_{i+1}=[a_{i+1,0}, \ldots a_{i+1,p-1}, s_{i+1,0}, \ldots s_{i+1,d-p-2}]^T$ respectively represent preamble signal of the $i^{th}$ and the $(i+1)^{th}$ signal frames that need to be removed, and $w_i=[w_{(i-1) \cdot l+p}, \ldots w_{(i-1) \cdot l+p+(n+d-2)}]^T$ denotes the AWGN vector. After performing the preamble removal (PR) and OLA operations, the post-OLA PR-received signal includes not only the desired signal and the additive noise, but also the ISI from the two adjacent TDS-OFDM symbols as depicted in FIGS. 3b and 3c.

Although the interference is a composite effect, the remedies to the two interferences from the two adjacent TDS-OFDM symbols are quite different. Since the unknown data symbols of the previous signal frame become known while demodulating the current signal frame, the ISI from the previous signal frame can be removed in the same manner as that done to the time-domain preamble signal. In practice, the extent of the ISI from the previous signal frame that can be removed depends on how many data symbols of the previous signal frame are correctly detected. On the contrary, the same approach is not applicable for relieving the ISI from the next signal frame because the unknown data symbols of the next signal frame are still unknown while the receiver is demodulating the current signal frame. Herein, we resort to signal reconstruction to mitigate the ISI from the next signal frame.

Figures 3B, 3C, 3D:
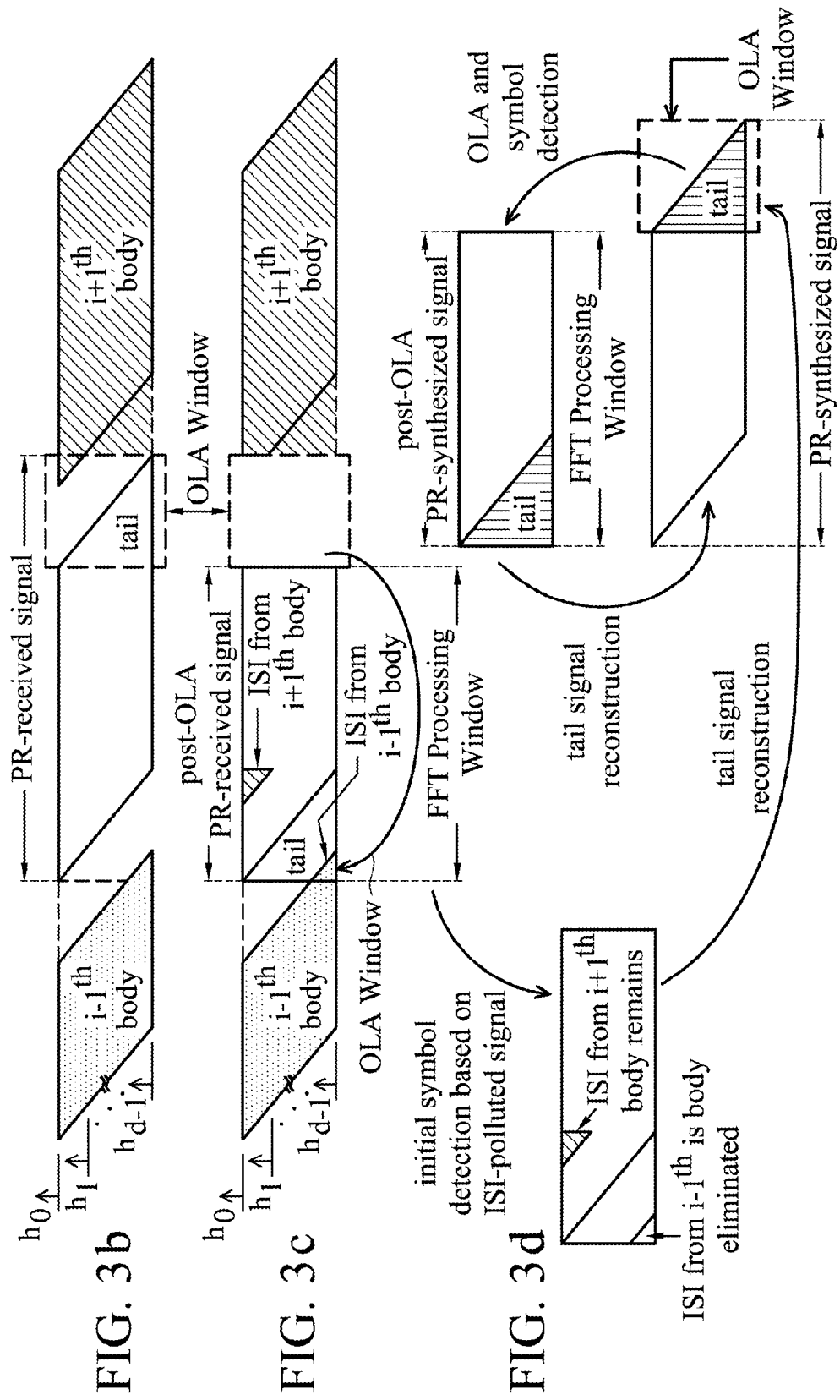
FIGS. 3b to 3d show the flow of the proposed iterative equalization algorithm in a large delay-spread channel.

Instead of directly performing data demodulation only once based on the still-ISI-polluted post-OLA PR-received signal as shown on the left side of FIG. 3(d), the desired time-domain signal components within the OLA window (referred to as the tail signal hereafter) are reconstructed from the linear convolution of the channel impulse response and the IDFT of the frequency-domain data symbols detected in the latest iteration as depicted on the lower right side of FIG. 3(d). The so-constructed time-domain signal is referred to as the PR-synthesized signal in the following context. After OLA operation, the receiver performs data demodulation again based on the post-OLA PR-synthesized signal as shown on the upper right side of FIG. 3(d). The same procedure is repeated several times until system performance saturates.

The notations employed to formulate the proposed iterative equalization algorithm are defined as follows.

$$h=[h_0,\ldots,h_{d-2}]^T$$

$$\hat{S}_i^{(g)}=[\hat{S}_{i,0}^{(g)},\ldots,\hat{S}_{i,n-1}^{(g)}]^T$$

$$\hat{s}_i^{(g)}=IDFT_n\{\hat{S}_i^{(g)}\}=[\hat{s}_{i,0}^{(g)},\ldots,\hat{s}_{i,n-1}^{(g)}]^T$$

$$t_i^{(g)}=[t_{i,n}^{(g)},\ldots,t_{i,n+d-1}^{(g)}]^T$$

$$r'_i^{(g)}=[r'_{i,0},\ldots,r'_{i,n-1},t_{i,n}^{(g)},\ldots,t_{i,n+d-1}^{(g)}]^T$$

$$r''_i^{(g)}=[t_{i,n}^{(g)},\ldots,t_{i,n+d-1},0\ldots,0]^T+[r'_{i,0},\ldots,r'_{i,n-1}]^T$$

where h is the channel impulse response vector, $\hat{S}_i^{(g)}$ represents the detected data symbol vector of $i^{th}$ signal frame evaluated in the $g^{th}$ iteration of the proposed algorithm and $\hat{s}_i^{(g)}$ is the associated time-domain frame body, $t_i^{(g)}$, $r'_i^{(g)}$, $r''_i^{(g)}$ respectively denote the reconstructed tail signal vector, the PR-synthesized signal, and the post-OLA PR-synthesized signal vector of the $i^{th}$ signal frame evaluated in the $g^{th}$ iteration of the proposed algorithm. The iterative equalization algorithm can then be formulated as the following steps:

(1) Remove all ISI of the know signals from the received signal vector $r_i$ and denote the known-signal-removed received signal vector as $r'_i^{(0)}$, in which the initial tail signal $t_i^{(0)}=[r'_{i,n},\ldots,r'_{i,n+d-1}]^T$ is the initial PR-received signal. Note that the known signals include a part of the generated time-domain frame body, $[\hat{s}_{i-1,n-(d-p)},\ldots,\hat{s}_{i-1,n-1}]^T$.

(2) Form $r'_i^{(0)}$ from $r_i^{(0)}$ by OLA operation. Then, $\hat{S}_i^{(0)}$ is initially detected by performing data demodulation based on $r''_i^{(0)}$ via DFT, followed by generating its associated time-domain frame body $\hat{s}_i^{(0)}$ via IDFT. Set g=1.

(3) The tail signal vector $t_i^{(g)}$ is reconstructed from the last (d−1) signal components of the linear convolution between $\hat{S}_i^{(g-1)}$ and h.

(4) The PR-synthesized signal vector $r'_i^{(g)}$ is formed by combining $[r'_{i,0},\ldots,r'_{i,n-1}]^T$ and $t_i^{(g)}$. Then, form the post-OLA PR-synthesized signal vector $r''_i^{(g)}$ from $r'_i^{(g)}$ by OLA operation.

(5) $\hat{S}_i^{(g)}$ is detected again by performing data demodulation based on $r''_i^{(g)}$ via DFT, followed by generating its associated time-domain frame body $\hat{s}_i^{(g)}$ via IDFT.

(6) Set g=g+1 and repeat step (3) to step (5) until BER (bit-error-rate) performance saturates.

Figure 4:
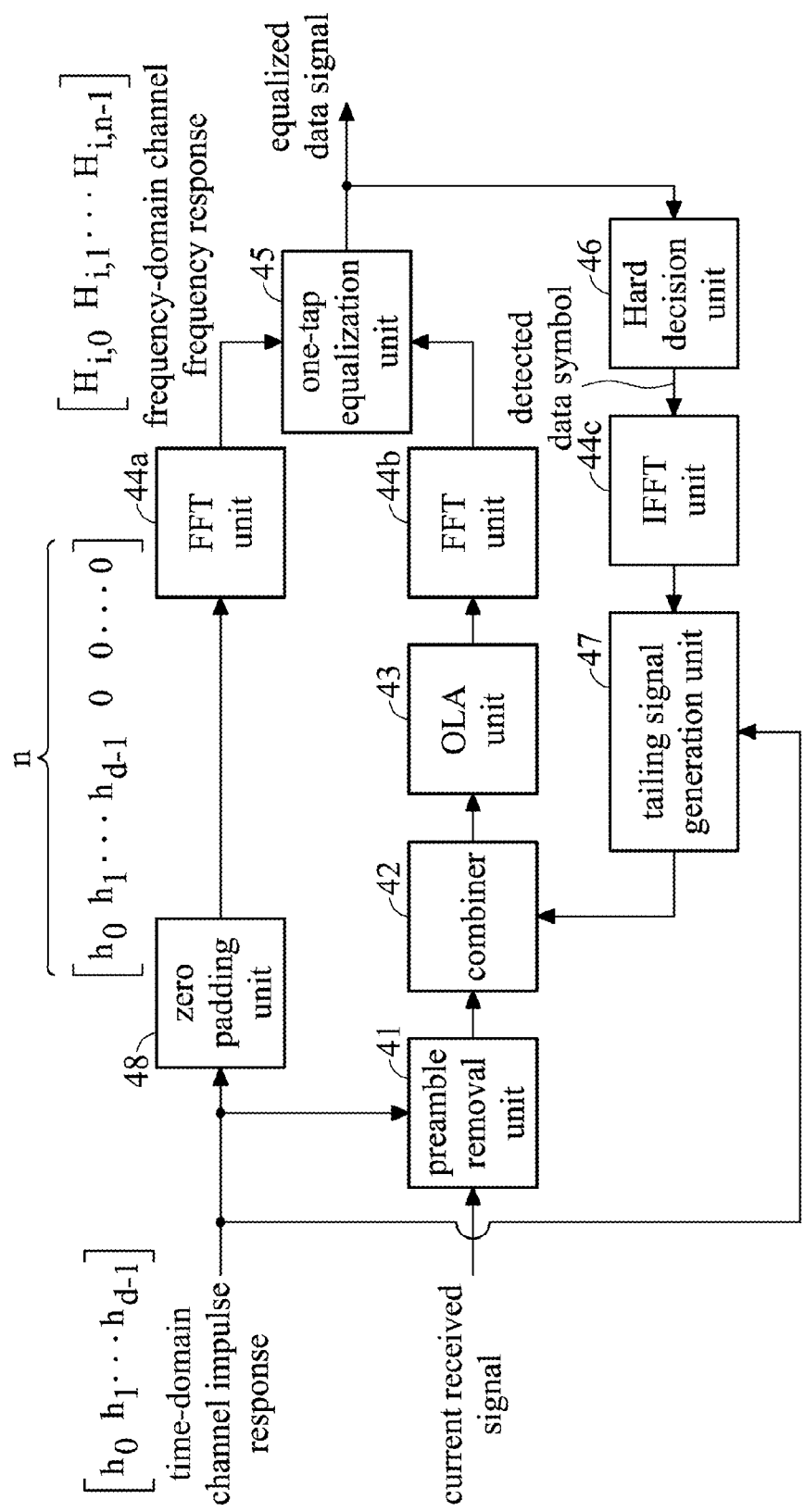
FIG. 4 is an iterative equalization unit for a received signal in TDS-OFDM/ZP-OFDM systems in large delay-spread channels according an embodiment of the invention.

FIG. 4 is an iterative equalization unit for a received signal in TDS-OFDM/ZP-OFDM systems according an embodiment of the invention. The iterative equalization unit may be embedded in an OFDM receiver or an ISI removal unit of an OFDM signal receiver. The zero padding unit 48 receives and modifies a time-domain channel impulse response to generate a first time-domain channel impulse response with $L_{fft}$ points by filling the data with "0". Then, the first FFT unit 44a receives the first time-domain channel impulse response to generate a frequency-domain channel frequency response. The preamble removal unit 41 receives and removes preamble signals from a current received signal to generate a preamble removed signal according to the time-domain channel impulse response. The combiner 42 combines the preamble removed signal and a tailing signal to generate a first signal, wherein the tailing signal is not generated at first, and thus, the combiner 42 just bypasses the preamble removed signal to the OLA unit 43 if the tailing signal is not available. The OLA unit 43 performs an OLA operation to the first signal to generate a second signal. The second FFT unit 44b receives the second signal and performs an FFT operation signal to generate a second frequency-domain signal. The one-tap equalization unit 45 performs a one-tap equalization operation on the first signal to generate a frequency-domain data signal according to the frequency-domain channel impulse response. The frequency-domain data signal is then fed back to a hard decision unit 46 to generate a third frequency-domain signal. The IFFT unit 44c receives the third frequency-domain signal to generate a third time-domain signal. The tailing signal generation unit 47 receives the third time-domain signal to generate a tailing signal according to the time-domain channel impulse response.

Figure 5:
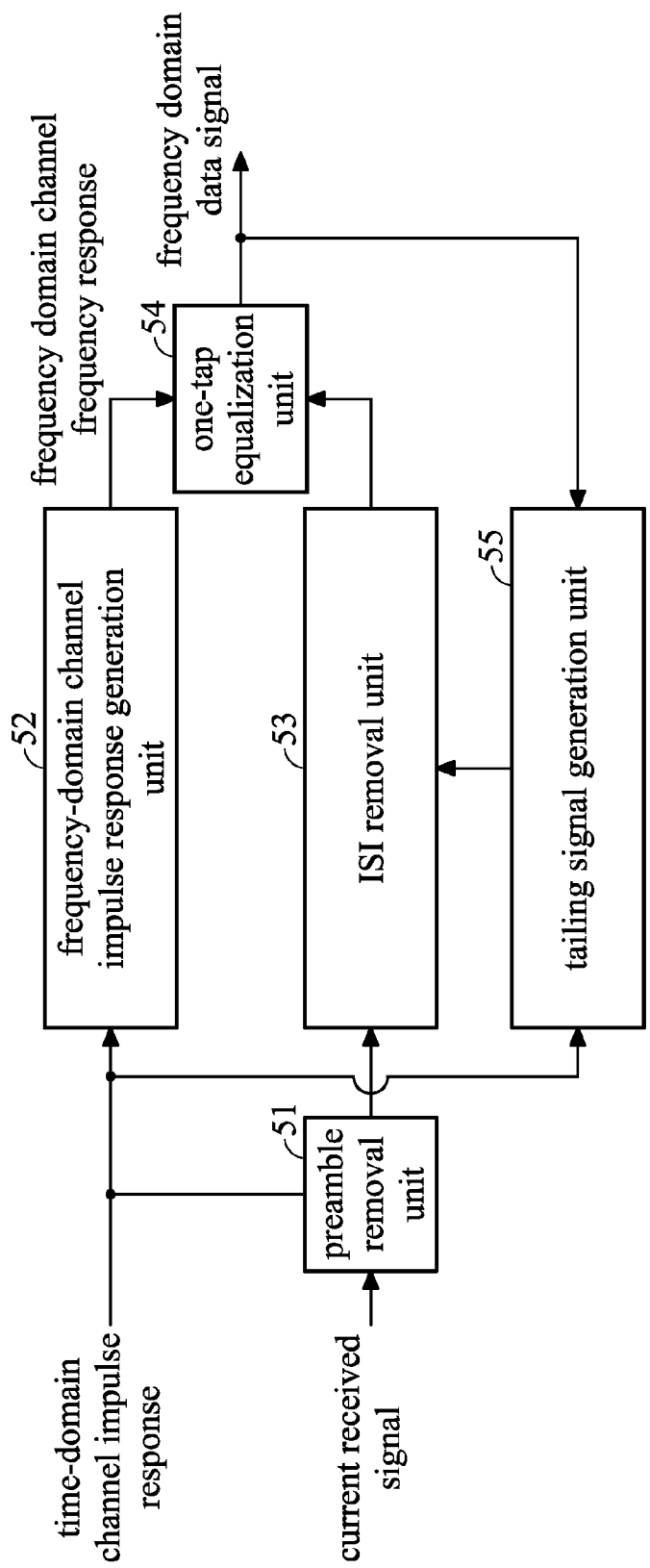
FIG. 5 is an iterative equalization unit for a received signal in TDS-OFDM/ZP-OFDM systems in large delay-spread channels according another embodiment of the invention.

FIG. 5 is an ISI removal unit for a received signal in TDS-OFDM/ZP-OFDM systems according an embodiment of the invention. The preamble removal unit 51 receives and removes preamble signals from a current received signal to generate a preamble removed signal according to the time-domain channel impulse response. The frequency-domain channel impulse response generation unit 52 receives the time-domain channel impulse response to generate a frequency-domain channel impulse response. The preamble removed signal is then transmitted to the ISI removal unit 53 to remove an inter-symbol interference therein to generate a first signal. The one-tap equalization unit 54 performs a one-tap equalization operation on the first signal to generate a frequency-domain data signal according to the frequency-domain channel impulse response. The frequency-domain data signal is then transmitted to a tailing signal generation unit 55 to generate a tailing signal that is input to the ISI removal unit 53 to further remove the inter-symbol interference caused by an upcoming frame. It is noted that when the ISI removal unit 53 removes the inter-symbol interference from the preamble removed signal for the first time, the ISI removal unit 53 only processes the preamble removed signal without the cooperation of the tailing signal. Only after the initial frequency-domain data signal is generated and the initial tailing signal is generated, will the ISI removal unit 53 further remove the inter-symbol interference from the preamble removed signal according to the tailing signal. According to the feedback mechanism, the frequency-domain data signal can be more precisely.

Figure 6:
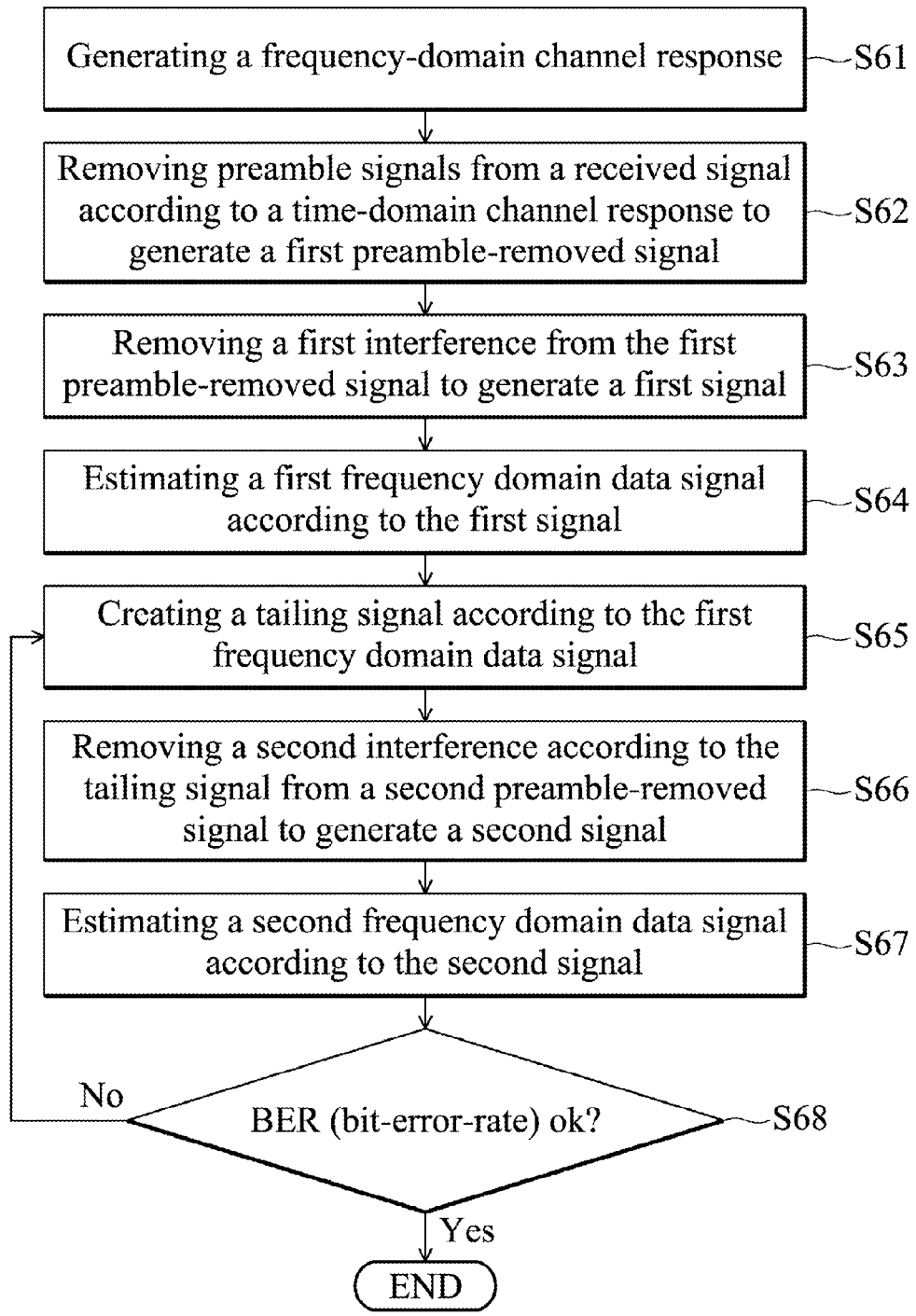
FIG. 6 is flowchart of an ISI removal method for a received signal in TDS-OFDM/ZP-OFDM systems according an embodiment of the invention.

FIG. 6 is flowchart of an ISI removal method for a received signal in TDS-OFDM/ZP-OFDM systems according an embodiment of the invention. In step S61, a channel response generator receives and transform a time-domain channel response into a frequency-domain response, wherein if the length of the time-domain channel response is shorter than the frequency-domain channel response, a zero padding unit may first fill the data "0" to modify the time-domain channel response, and the frequency-domain channel response is therefore generated according to the modified time-domain channel response. In step S62, a preamble removal unit receives and removes preamble signals from a received signal according to the time-domain channel response to generate a preamble-removed signal. In step S63, an ISI removal unit removes a first interference from the first preamble-removed signal to generate a first signal, wherein the first interference is caused by a known signal of the received signal. In step S64, an one-tap equalization operation is performed on the first signal to estimate a first frequency domain data signal. In step S65, the first frequency domain data signal is used to create a tailing signal and then, in the step S66, an ISI removal unit removes a second interference according to the tailing signal from a second preamble-removed signal to generate a second signal, wherein the second preamble-removed signal is the signal next to the first preamble-removed signal, and the second interference is caused by an unknown (upcoming) signal. In step S67, the one-tap equalization operation is performed on the second signal to estimate a second frequency domain data signal. In step S68, a determination unit determines a bit-error-rate of the second frequency domain data signal. If the bit-error-rate of the second frequency domain data signal satisfies a predetermined situation, the procedure ends, and if not, the procedure goes back to step S65 until the performance satisfies the predetermined situation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An inter-symbol interference (ISI) removal method for a received signal executed by a receiver in an orthogonal frequency division multiplexing (OFDM) system to estimate a frequency-domain data signal carried on the received signal, wherein the interference of the received signal comprises a first interference caused by a known signal of the received signal and a second interference caused by an unknown signal, comprising:
    removing the first interference from the received signal to generate a first signal;
    estimating a first frequency domain data signal according to the first signal;
    creating a tailing signal according to the first frequency domain data signal; and
    estimating a second frequency domain data signal according to the tailing signal and the received signal.

2. The ISI removal method as claimed in claim 1, further comprising:
    generating a frequency domain channel frequency response according to a time domain channel impulse response; and
    estimating the first frequency domain data signal according to the received signal and the frequency domain channel frequency response.

3. The ISI removal method as claimed in claim 1, further comprising:
    removing a preamble signal from the received signal to generate a preamble removed signal by an overlap and add operation; and
    removing the first interference from the preamble removed signal.

4. The ISI removal method as claimed in claim 3, further comprising:
    performing a Fast Fourier Transform operation on the preamble removed signal to generate a first frequency domain signal; and
    estimating the first frequency domain data signal according to the first frequency domain signal and a frequency domain channel frequency response.

5. The ISI removal method as claimed in claim 4, further comprising:
    performing a hard decision operation on the first data signal to generate a second frequency domain signal;
    performing an Inverse Fast Fourier Transform operation on the second frequency domain signal to generate a first time domain signal; and
    generating the tailing signal according to the first time domain signal.

6. A receiver in an orthogonal frequency division multiplexing (OFDM) system, comprising:
    a preamble removal unit receiving and removing preamble signals from a received signal to generate a preamble removed signal according to a time domain channel impulse response;
    an inter-symbol Interference (ISI) removal unit receiving and removing an inter symbol interference from the preamble removed signal to generate a first signal;
    a one-tap equalization unit receiving the first signal to generate a first frequency domain data signal; and
    a tailing signal generation unit receiving the first frequency domain data signal to generate a tailing signal, wherein the first signal is generated according to the tailing signal.

7. The receiver as claimed in claim 6, further comprising:
    a frequency domain channel impulse response generation unit receiving the time domain channel impulse response to generate a frequency domain channel impulse response and the first frequency domain data signal is generated further according to the frequency domain channel impulse response.

8. The receiver as claimed in claim 6, wherein the tailing signal generation unit further comprises an Inverse Fast Fourier Transform unit generating a first time domain signal according to the first frequency domain data signal, and the tailing signal is generated according to the first time domain signal.

9. The receiver as claimed in claim 6, wherein the tailing signal generation unit further comprises:
    a hard decision unit receiving the first frequency domain data signal to generate a second frequency domain signal; and
    an Inverse Fast Fourier Transform unit receiving and transforming the second frequency domain signal into a first time domain signal, wherein the tailing signal is generated according to the first time domain signal.

10. The receiver as claimed in claim 6, wherein the ISI removal unit comprises:
    a combiner to combine the preamble removed signal with the tailing signal to generate a second signal;
    an overlap-and-add (OLA) unit performing an OLA operation on the second signal to generate a third signal; and
    a fast Fourier transform (FFT) unit performing an FFT operation on the third signal to generate the first signal.

* * * * *